(12) United States Patent
Garate Fel et al.

(10) Patent No.: US 8,197,625 B2
(45) Date of Patent: Jun. 12, 2012

(54) PROCESS OF MANUFACTURING COMPOSITE STRUCTURES WITH EMBEDDED PRECURED TOOLS

(75) Inventors: Enrique Garate Fel, Madrid (ES); Enrique Redondo Vara, Madrid (ES); Jose Sanchez Gomez, Madrid (ES); Rafael Ruiseco Salgado, Madrid (ES); César Serrano Velaz, Madrid (ES)

(73) Assignee: Airbus Espana S. L., Madrid (ES)

( * ) Notice: Subject to any disclaimer, the term of this patent is extended or adjusted under 35 U.S.C. 154(b) by 0 days.

(21) Appl. No.: 11/476,429

(22) Filed: Jun. 28, 2006

(65) Prior Publication Data
US 2007/0151657 A1 Jul. 5, 2007

(30) Foreign Application Priority Data
Dec. 29, 2005 (WO) ................. PCT/ES2005/070185

(51) Int. Cl.
*B29C 43/28* (2006.01)

(52) U.S. Cl. ........ 156/213; 156/227; 156/285; 264/241; 264/255; 264/259; 264/271.1; 264/272.11; 264/272.12; 264/272.13; 264/272.14; 264/272.15; 264/279.1

(58) Field of Classification Search .................. 156/213, 156/299, 285, 286, 381, 382, 212, 227, 443, 156/475; 244/133; 264/511, 259, 271.1, 264/241, 255, 272.11–272.15, 279.1; 425/502
See application file for complete search history.

(56) References Cited

U.S. PATENT DOCUMENTS

| | | | | |
|---|---|---|---|---|
| 4,256,790 A * | 3/1981 | Lackman et al. | ............... | 428/73 |
| 4,946,526 A * | 8/1990 | Petty-Galis et al. | .......... | 156/155 |
| 5,236,646 A * | 8/1993 | Cochran et al. | ............... | 264/102 |
| 5,242,523 A * | 9/1993 | Willden et al. | ............... | 156/285 |
| 5,433,915 A * | 7/1995 | Yamamoto et al. | ........... | 264/510 |
| 6,139,942 A * | 10/2000 | Hartness et al. | ........... | 428/298.1 |
| 6,702,911 B2 * | 3/2004 | Toi et al. | ......................... | 156/93 |
| 6,849,150 B1 * | 2/2005 | Schmidt | ......................... | 156/285 |
| 2005/0023728 A1 * | 2/2005 | Benson et al. | ................. | 264/258 |
| 2006/0226287 A1 * | 10/2006 | Grantham et al. | ............. | 244/119 |

* cited by examiner

*Primary Examiner* — Christopher Schatz
(74) *Attorney, Agent, or Firm* — Ladas & Parry LLP

(57) ABSTRACT

The present invention relates to a process for manufacturing composite structures formed by two subcomponents of the same material, characterized in that it comprises the following steps: providing a first subcomponent (13), particularly a skin; providing a tool (15) made of a composite and precured for the manufacture of the second subcomponent (17), particularly a stiffener; positioning said tool (15) on said first subcomponent (13); applying preimpregnated composite (21) on said tool (15) so as to form the second subcomponent (17); consolidating the composite structure by means of a process of curing the assembly resulting from the previous steps under suitable pressure and/or temperature conditions.

11 Claims, 1 Drawing Sheet

PROCESS OF MANUFACTURING COMPOSITE STRUCTURES WITH EMBEDDED PRECURED TOOLS

FIELD OF THE INVENTION

The present invention relates to a process of manufacturing composite structures, and more particularly to a process in which at least one tool used for shaping one of its subcomponents remains embedded in the structure.

BACKGROUND OF THE INVENTION

In the aerospace industry today, mainly organic matrix, and continuous fibers composites based on epoxy resins and carbon fibers are widely used.

The level of use of this type of structures has been gradually increasing, particularly in the aeronautics industry, to a point where epoxy matrix and carbon fiber composites can be considered the option used most in a wide variety of structural components. This has forced and continues to force the development of manufacturing processes capable of producing components with the required quality in a repetitive manner and with a manufacturing cost that is appropriate for the component to be manufactured. The tool plays a fundamental role in this aspect, so the elimination or reduction thereof is one of the key points in making the production process less expensive.

It can generally be considered that a large integration of components in a single manufacturing cycle implies a very complex and therefore expensive and difficult to use tool system. On the other hand, the manufacture of simple components joined together in a final bonding or riveting process usually implies much simpler tools and less costly and more reliable systems of manufacturing the components themselves. However, this last system has obvious disadvantages from the point of view of the complexity of the production system as a large number of components must be worked with, and from the point of view of the structure itself as it implies complex surface preparation systems prior to bonding and, of course, a final product weight increase.

It therefore seems evident that any production system that allows producing components with a high structural integration level but with a reduced or nonexistent tool system would address the drawbacks indicated above. This would enable the production of more cost-effective structures while at the same time having a high integration level and therefore lower final weight.

The known processes of manufacturing organic matrix and continuous fiber composite structures, using both co-cured, co-bonding or secondary bonding systems, are always based on oven, vacuum bag and/or autoclave curing systems with a tool that is external to the component to be manufactured, which has a variable complexity level according to the complexity and level of responsibility of the final piece to be manufactured.

The present invention relates to a more efficient process for manufacturing said structures.

SUMMARY OF THE INVENTION

The present invention proposes a process for manufacturing composite structures formed by two subcomponents of the same material, comprising the following steps:
Providing a first subcomponent, particularly a planar or curved skin.
Providing a precured composite tool for manufacturing the second subcomponent, particularly a stiffener.
Positioning said tool on said first subcomponent.
Applying a preimpregnated composite on said tool to form the second subcomponent.
Consolidating the composite structure by means of a process of curing the assembly resulting from the previous steps under suitable temperature and pressure conditions.

For the purpose of the present invention, the term composite is understood as any organic matrix material (epoxy, phenol, bismaleimide, polyimide, vinyl ester, . . . ) and continuous reinforcement fibers (carbon, several types of ceramics, glass, organic (polyaramide, pbo, . . . )). For the purpose of the present invention, subcomponents of a structure are understood as those parts thereof shaped at different times of its manufacturing process.

The essential feature of the process according to the present invention is the use of tools that remain built into the structure itself. These tools are preferably made of the same composite as the structure or with a composite considered to be compatible with it and are provided to the process object of the present invention in a precured state.

The process of manufacturing organic matrix composite structures according to the present invention can be understood as a subcomponent co-curing or co-bonding process that reduces or eliminates the use of complex tools both inside and outside the vacuum bag.

Structures manufactured by the process of the present invention are preferably structures used in the aerospace industry, though the process is also applicable for the manufacture of structures useful in the military, naval, automotive, power generation or construction industries, or in any other industry demanding the use of materials with good mechanical properties.

One advantage of the process of the invention is that it opens up the possibility of manufacturing structures with a high integration level by using tools that become built into the structure itself and simple tools on the outside, which can even be eliminated in certain structural configurations. The built-in tool may further be designed so as to allow a double function as a tool and as a supporting structure of the load for which the piece was designed.

Other features and advantages of the present invention shall be gathered from the following detailed description of an illustrative embodiment of its object in relation to the attached drawings.

DETAILED DESCRIPTION OF THE INVENTION

The process of manufacturing composite structures according to the present invention is particularly applicable to the manufacture of planar or curved structures with T-, Ω- or H-shaped stiffeners, and described below is the case of a planar structure stiffened with T-shaped stringers.

Figure 1:
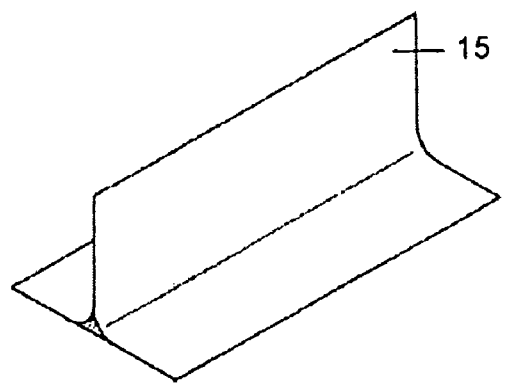
FIG. 1 shows a perspective view of a tool used in a process according to the present invention.

A precured T-shaped component 15 (see FIG. 1) made of planar carbon fiber fabric preimpregnated with epoxy resin, with a thickness exceeding 0.4 mm is used as the tool that will remain built into the structure. The tool 15 can be continuous or discontinuous, depending on the shape of the final structure to be manufactured.

The process is carried out on a table 11 on which the planar structure 13, the first subcomponent of the structure, is arranged.

The tool 15 is positioned on the planar structure 13, being able to use an auxiliary means 19 between them, such as an adhesive film or layer of preimpregnated material. The tool 15 may require treatment prior to the bonding process provided that correct bonding is needed if the tool is to carry out a resistant function.

Then layers of preimpregnated material 21 are applied on the tool 15 so as to shape the T-shaped stringer 17, the second subcomponent of the structure.

Once the stringer 17 shaping process has concluded, the vacuum bag 31 is manufactured, including several layers 33, 35, 37, as is known in the art, for the subsequent consolidation of the structure using known processes, such as oven or autoclave curing.

Co-bonding of the stringer 17 to the tool 15 using an adhesive film compatible with the composite used can be carried out during the process.

Figures 2A, 2B:
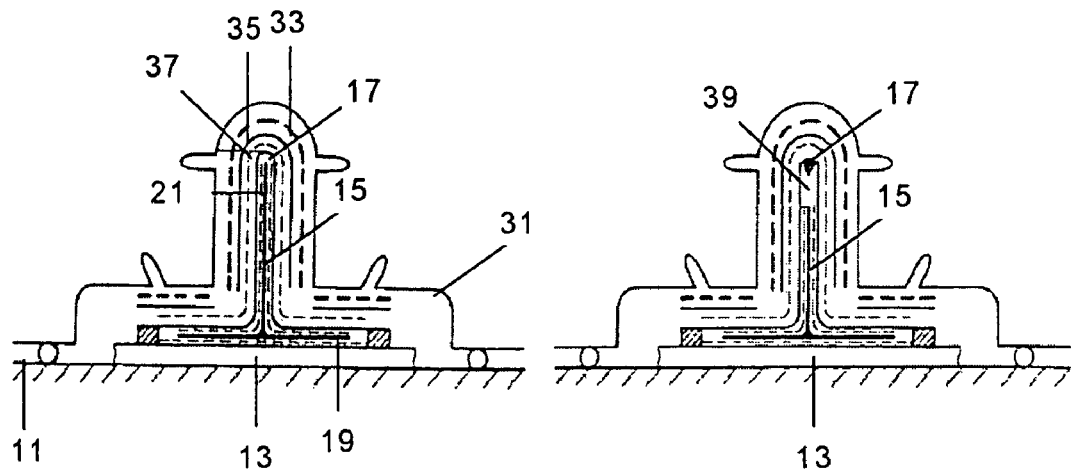
FIGS. 2a and 2b show respective cross-section views of installations for manufacturing structures according to the process object of the present invention.

FIG. 2a shows a stringer 17 in which the web of the precured tool 15 extends along the web of the stringer, whereas FIG. 2b shows a stringer with a portion 39 to which the precured tool 15 does not extend. In this sense, sizing of the precured tool shall be carried out taking into account the structural requirements for the piece.

Figure 3:
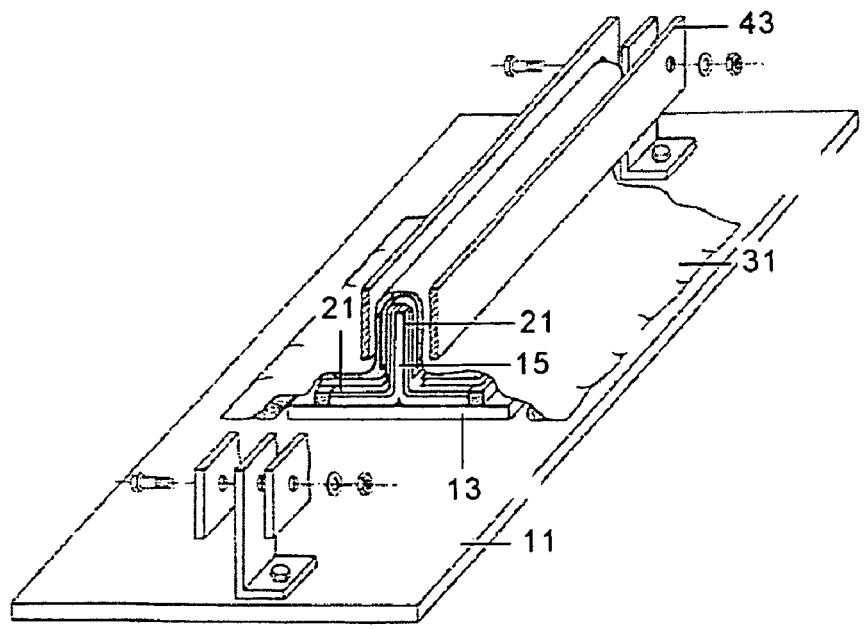
FIG. 3 shows a perspective view of an installation for manufacturing structures according to the process object of the present invention.

Particularly, in the case of a stringer 17 with a portion 39 exclusively made with preimpregnated material, such as that shown in FIG. 2b, and for the purpose of maintaining the shape of the stringer 17, an external tool 43 outside the vacuum bag 31 can be used so as to maintain the final geometry of the structure to be manufactured (see FIG. 3).

The internal precured tool 15 may be made of the same composite used in the manufacture of the rest of the structure or of a material considered compatible. Compatibility is considered only from the point of view of the process of co-bonding to the rest of the structure. In this sense the process of bonding the precured tool to the rest of the structure can be done directly with the resin of the preimpregnated material or by using an adhesive film compatible with the preimpregnated material.

In view of the foregoing explanation, it is understood that the precured tool must be designed according to the structure to be manufactured, first taking into account the material to be used (compatible or one that experiences degradation with the final curing system), secondly the structural requirements of the component (need or no need for surface treatment and adhesive film), and thirdly the dimensional requirements of the second subcomponent which will incidentally determine the need for simplified external tools outside the second subcomponent.

The possibility of reducing or even eliminating the complex tools that the present manufacturing process offers has an important effect on reducing power consumption in the final curing process, and it may additionally prevent carrying out additional curing cycles, with the subsequent reduction of the final energy consumption required for the process.

Any modifications comprised within the scope defined by the following claims can be introduced in the preferred embodiment described above.

The invention claimed is:

1. A method for manufacturing a composite structure of a desired shape, comprising the steps of:
   a) providing a first subcomponent made of a first composite material;
   b) providing a preformed tool made of a second composite material, said preformed tool having the desired shape;
   c) positioning said preformed tool on said first subcomponent;
   d) shaping a preimpregnated composite material by applying the preimpregnated composite material over said preformed tool to conform a shape of the preimpregnated composite material at least to the shape of the preformed tool whereby to form a second subcomponent, the first and second subcomponents forming an assembly comprising the preformed tool embedded therewithin;
   e) curing the assembly under suitable pressure and/or temperature conditions to form the composite structure,
   wherein the preimpregnated composite material comprises a resin and the preformed tool comprises a material that bonds directly with the resin of the preimpregnated composite material during the curing step;
   and wherein step (d) comprises folding the preimpregnated composite material to form first and a second section sections with surfaces facing each other and in an upper end portion protruding beyond an uppermost end of said tool bringing said facing surfaces into contact so as to produce said upper end portion made exclusively of the preimpregnated composite material which extends from the uppermost end of the tool to an uppermost end of the structure.

2. A method for manufacturing a composite structure according to claim 1, wherein the preformed tool is made of the same material as the first and second subcomponents.

3. A method for manufacturing a composite structure according to claim 1, wherein the preformed tool is made of a material that is different from the material of the first and second subcomponents but can be bonded to the first subcomponent.

4. A method for manufacturing a composite structure according to claim 1, wherein the preformed tool is made such that it collaborates in the structure's resistant function.

5. A method for manufacturing a composite structure according to claim 1, further comprising the step of, prior to step c), arranging a layer of adhesive or prepreg between the first component and the preformed tool.

6. A method for manufacturing a composite structure according to claim 1, further comprising providing an external tool placed at least partially over the preimpregnated material to facilitate shaping of the upper end portion made exclusively of the preimpregnated material.

7. A method for manufacturing a composite structure according to claim 1, wherein the first subcomponent is a planar structure and the second subcomponent is a T-shaped stiffener of the planar structure.

8. A method for manufacturing a composite structure according to claim 1, wherein the first subcomponent is a curved structure and the second subcomponent is a T-shaped stiffener of the curved structure.

9. A method for manufacturing a composite structure according to claim 1, wherein the preformed tool is t-shaped.

10. A method for manufacturing a composite structure of a desired shape, comprising the steps of:
    a) providing a first subcomponent made of a first composite material;

b) providing a preformed tool made of a second composite material said preformed tool having the desired shape;
c) positioning said preformed tool on said first subcomponent;
d) shaping a preimpregnated composite material by applying the preimpregnated composite material over said preformed tool to conform a shape of the preimpregnated composite material at least to the shape of the preformed tool whereby to form a second subcomponent, the first and second subcomponents forming an assembly comprising the preformed tool embedded therewithin; and
e) curing the assembly under suitable pressure and/or temperature conditions to form the composite structure wherein the preimpregnated composite material bonds with the preformed tool;

wherein step (d) comprises folding the preimpregnated composite material to form a first section and a second section, said folding producing an upper end portion of preimpregnated composite material wherein part of the first section of the preimpregnated composite material is brought into contact with part of the second section of the preimpregnated composite material; and wherein said upper end portion extends from an uppermost end of the tool to an uppermost end of the structure.

11. A method for manufacturing a composite structure according to claim 1, wherein the step of forming the upper end portion made exclusively of the preimpregnated composite material includes using an external tool to facilitate the shaping of the portion.

* * * * *